United States Patent [19]

Chaudhari et al.

[11] Patent Number: 5,606,013

[45] Date of Patent: Feb. 25, 1997

[54] POLYAMIC ACIDS AND POLYIMIDES

[75] Inventors: Mohammad A. Chaudhari, Bethel; John J. King, Ridgefield; Byung Lee, Brookfield, all of Conn.

[73] Assignee: Ciba-Geigy Corporation, Tarrytown, N.Y.

[21] Appl. No.: 948,278

[22] Filed: Dec. 31, 1986

[51] Int. Cl.$^6$ ..................................... C08G 73/10
[52] U.S. Cl. ................. 528/353; 528/125; 528/128; 528/172; 528/173; 528/176; 528/183; 528/188; 528/220; 528/229; 528/350; 264/241; 264/331.11; 264/331.19
[58] Field of Search ............................... 528/353

[56] References Cited

U.S. PATENT DOCUMENTS

| | | | |
|---|---|---|---|
| 3,105,839 | 10/1963 | Renner | 260/346.3 |
| 3,528,950 | 9/1970 | Lubowitz | 260/78.4 |
| 3,803,081 | 4/1974 | Lubowitz | 260/37 N |
| 3,856,752 | 12/1974 | Bateman et al. | 260/65 |
| 3,983,092 | 9/1976 | Bateman et al. | 260/47 EN |
| 4,414,269 | 11/1983 | Lubowitz et al. | 428/290 |
| 4,584,364 | 4/1986 | Lubowitz et al. | 528/128 |

FOREIGN PATENT DOCUMENTS 2002378  2/1979  United Kingdom.

*Primary Examiner*—Charles T. Jordan
*Assistant Examiner*—John R. Hardee
*Attorney, Agent, or Firm*—Harry Falber; William A. Teoli, Jr.

[57] ABSTRACT

Polyamic acids and corresponding polyimides are prepared by reacting phenylindane diamines, aromatic polyfunctional anhydrides or esters thereof, and nadic anhydride or allyl-nadic anhydride end capping agents, the resulting products exhibiting excellent properties and being suitable for the preparation of prepregs, composites, adhesives, coatings, and the like.

16 Claims, No Drawings

POLYAMIC ACIDS AND POLYIMIDES

Advanced fiber reinforced polymeric matrix composites are finding increased use in the fabrication of high performance aerospace structural components. Current advanced composites are generally based on epoxy matrices which have many desirable performance and processing characteristics but have the disadvantage of having limits of upper use temperature of 175°–205° C.

High temperature polymers e.g. polyimides, polybenzimidizoles, polyphenylquinoxalines, and the like, have been known to researchers for considerable lengths of time but the intractable nature of these materials has prevented the realization of their full potential as matrix resins for high temperature polymer matrix composites.

Polyimide resins, for example, are noted for their outstanding physical and chemical properties, particularly their high temperature thermal stability and high temperature strength. In view of these attractive properties, polyimides have found numerous applications in fields of advancing technology where high-strength, high-temperature materials are required. While these outstanding properties render the polyimides attractive for many and specific applications, various problems have limited the full potential use of polyimides.

Approaches to resolving certain of these disadvantages have been disclosed, for example, in U.S. Pat. No. 3,528,950, U.S. Pat. No. 3,745,149 and U.S. Pat. No. 3,803,081. In general, these patents disclose the preparation of polyimides wherein polyfunctional amines and polyfunctional anhydrides are coreacted with end-capping monoanhydrides in an attempt to alleviate processing, stability and economic disadvantages. More specifically, the process of U.S. Pat. No. 3,745,149 consists of impregnating reinforcing fibers with the monomer mixture dissolved in low boiling solvents such as alkyl alcohols. The monomer mixture undergoes sequential in-situ condensation and ring opening addition crosslinking reactions at elevated temperature to form the polyimide resin. However, this approach also exhibits disadvantages in that the reactive monomer solution has limited shelf life; during processing, the monomers undergo sequential in-situ condensation and ring opening giving rise to cyclopentadiene which is alleged to further react with the maleic entity but during actual composite fabrication the evolution of cyclopentadiene leads to the formation of voids giving lower quality laminates; and processing of such polyimides generally requires high temperature and pressure conditions.

In addition, a further approach is noted in U.S. Pat. No. 3,856,752, which describes the preparation of polyimide polymers utilizing diaminodiphenylindane and aromatic dianhydrides. The resultant polyimides exhibit numerous advantages over the polyimides of the prior art but still encounter certain processing problems due to reduced solubility and flow characteristics.

It has now been discovered that meaningful improvements can be achieved by utilizing phenylindane diamines as the polyfunctional amine component incorporated into the polyimide backbone with the monoanhydride end capping agents as specified in the prior art. It has also been determined that further improvements can be achieved by utilizing the phenylindane diamines in conjunction with allyl-substituted monoanhydrides. In particular, reinforced composites can be fabricated with these systems using lower temperature and pressure conditions. These polyimides have excellent solubility in common organic solvents and have extremely good thermal/mechanical properties and, unlike the prior art, have good toughness characteristics.

Benefits are particularly noted as follows:

1. Polyamic acid and polyimides with diaminophenylindane in the backbone and allylnadic end-capped are soluble in polar organic solvents in very high concentrations unlike the intractable nature of the prior art polyimides.
2. The products of the instant invention can be used for composites and coatings, and laminating, film and adhesive applications.
3. They can be processed at comparatively lower temperature/pressure conditions in the area of 260°–290° C./50–150 psi.
4. Both the resulting polyamic acid and polyimide materials are stable at room temperature.
5. Unlike prior art polyimides, the materials have excellent toughness characteristics.
6. The polyimides of the invention are extremely useful in that they can be dissolved in common organic solvents in high concentrations (>50%) and the solutions can then be employed for composite fabrications, adhesive varnishes or coating applications.
7. The inventive approach allows for production of the final product from solution without the necessity for using a polyamic acid intermediate with a subsequent conversion step.
8. Thermal mechanical properties are substantially improved.

The applicable phenylindane diamines correspond to the formula

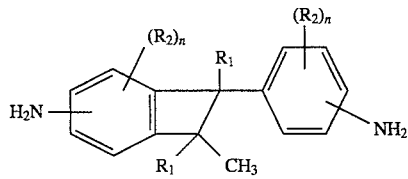

wherein $R_1$ is hydrogen or $C_1$–$C_5$ alkyl;

$R_2$ independently are hydrogen, halogen or $C_1$–$C_4$ alkyl; and n is 1–4.

The phenylindane diamine component can consist of any combination of the isomeric or substitued isomeric diamino compounds. For example, the phenylindane diamine component can comprise from 0 to 100 percent of 5-amino-1-(4'-aminophenyl)-1,3,3-trimethylindane in combination with from 100 to 0 percent of 6-amino-1-(4'-aminophenyl)-1,3,3-trimethylindane. Further, either or both of these isomers can be substituted over the entire range from 0 to 100 percent by any of the substituted diamino isomers without impairing the novel soluble nature of the polyimides. Examples of such substituted diamino isomers are 5-amino-6-methyl-1-(3'-amino-4'-methylphenyl)-1,3,3-trimethylindane, 5-amino-1-(4'-amino-Ar',Ar'-dichlorophenyl)-Ar,Ar-dichloro-1,3,3-trimethylindane, 6-amino-1-(4'-amino-Ar', Ar'-dichlorophenyl)-Ar,Ar-dichloro-1,3,3-trimethylindane, 4-amino-6-methyl-1-(3'-amino-4'-methylphenyl)-1,3,3-trimethylindane and Ar-amino-1-(Ar'-amino-2',4'-dimethylphenyl)-1,3,3,4,6-pentamethylindane. The prefixes Ar and Ar' in the above formulae indicate indefinite positions for the given substituents in the phenyl rings.

Among the phenylindane diamines, those are preferred in which $R_1$ is hydrogen or methyl, and $R_2$ independently are hydrogen, methyl, chloro or bromo. More preferred phenylindane diamines are those in which $R_1$ is hydrogen or methyl, and $R_2$ independently are hydrogen, methyl, chloro or bromo, and the amino groups are at positions 5, 6 or 7 and at positions 3' or 4'. Among the phenylindane diamines, those are most preferred in which $R_1$ is hydrogen or methyl, $R_2$ is hydrogen and the amino groups are at positions 5 or 6 and at position 4'.

The phenylindane diamines and methods for their preparation are disclosed in U.S. Pat. No. 3,856,752 and U.S. Pat. No. 3,983,092.

The polyfunctional anhydrides and esters thereof correspond to the formulae

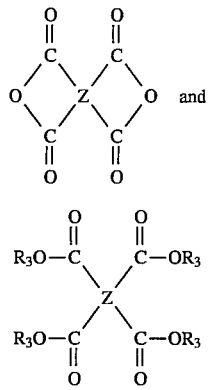

wherein Z is a tetravalent aryl radical; and $R_3$ is hydrogen or $C_1$–$C_6$ alkyl, with at least two $R_3$ groups being alkyl.

The aryl radical may, for example, be substituted or unsubstituted phenyl, naphthyl or biphenyl rings or two phenyl groups linked by O, S, $SO_2$, carbonyl, carboxy or alkylene, or aryl rings containing heterocyclic atoms such as pyrazine or thiophene.

The following species are typical of tetracarboxylic acid dianhydrides suitable for practicing the invention:
2,3,9,10-perylene tetracarboxylic acid dianhydride
1,4,5,9-naphthalene tetracarboxylic acid dianhydride
2,6-dichloronaphthalene-1,4,5,8-tetracarboxylic acid dianhydride
2,7-dichloronaphthalene-1,4,5,8-tetracarboxylic acid dianhydride
2,3,6,7-tetrachloronaphthalene-1,4,5,8-tetracarboxylic acid dianhydride
phenanthrene-1,8,9,10-tetracarboxylic acid dianhydride
2,3,3',4'-benzophenonetetracarboxylic acid dianhydride
3,3',4,4'-benzophenonetetracarboxylic acid dianhydride
2,2',3,3'-benzophenonetetracarboxylic acid dianhydride
3,3',4,4'-biphenyltetracarboxylic acid dianhydride
2,2',3,3'-biphenyltetracarboxylic acid dianhydride
4,4'-isopropylidenediphthalic anhydride
3,3'-isopropylidenediphthalic anhydride
4,4'-oxydiphthalic anhydride
4,4'-sulfonyldiphthalic anhydride
3,3'-oxydiphthalic anhydride
4,4'-methylenediphthalic anhydride
4,4'-thiodiphthalic anhydride
4,4'-ethylidenediphthalic anhydride
2,3,6,7-naphthalenetetracarboxylic acid dianhydride
1,2,4,5-naphthalenetetracarboxylic acid dianhydride
1,2,5,6-naphthalenetetracarboxylic acid dianhydride
benzene-1,2,3,4-tetracarboxylic acid dianhydride
pyrazine-2,3,5,6-tetracarboxylic acid dianhydride
thiophene-2,3,4,5-tetracarboxylic acid dianhydride,
and the indicated esters thereof.

Such anhydrides and esters and methods for their preparation are disclosed in U.S. Pat. No. 3,745,149 and U.S. Pat. No. 3,856,752, such teachings being fully incorporated herein.

The monofunctional anhydride end-capping agents correspond to the formula

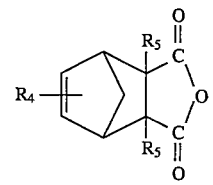

wherein $R_4$ is hydrogen, $C_1$–$C_6$ alkyl, allyl or methallyl; and $R_5$ is hydrogen or $C_1$–$C_6$ alkyl.

Anhydrides wherein $R_4$ is hydrogen, allyl or methallyl and $R_5$ is hydrogen are preferred for purposes of this invention. Such anhydrides and methods for their preparation are disclosed in U.S. Pat. No. 3,105,839 and U.S. Pat. No. 3,745,149.

The polyamic acids or polyimides are prepared by reacting the phenylindane diamine, polyfunctional anhydride or ester and monoanhydride at temperatures ranging from 0° to 25° C. in the presence of a solvent. It is possible to prepare mixtures of polyamic acids and polyimides depending on the reaction temperature. The components may be reacted in any order, although it is preferred to first react the polyfunctional and monofunctional anhydrides and then the phenylindane diamine. The reactants are utilized in approximately stoichiometric proportions, i.e. the equivalence of amine calculated to equal substantially the equivalence of the total anhydride content. However, an excess, e.g. of up to about 5% of either group, may be utilized. Where the polyamic acid is prepared, imidization may be accomplished by known techniques, for example, by chemical or thermal imidization.

The organic solvents which may be utilized in preparing the polymers include various organic liquids whose functional groups do not react with the polymers. Normally, organic solvents comprising the N,N-dialkylcarboxylamines are useful. The preferred solvents, however, are the lower molecular weight materials including N,N-dimethylformamide, N,N-dimethylacetamide, N,N-diethylformamide, N,N-diethylacetamide, etc. In addition, solvents which may be used include dimethylsulfoxides, N-methyl-2-pyrrolidone, pyridine, formamide, N-methylformamide, butyrolactone, etc. These solvents may be used either alone or in combination with other organic liquids, including for example, benzene, dioxane, butyrolactone, toluene, xylene, cyclohexane, and various mixtures thereof in any proportion.

The resulting polyamic acid and polyamide polymers will generally have average molecular weights ranging from 2,000–20,000, and preferably 2,000–10,000. The polymers are readily soluble in organic solvents such as chloroform, dimethylacetamide, N-methylpyrrolidone and methylene chloride.

The subsequent curing of the polymers of this invention is within the knowledge of the art. Curing is effected at temperatures of between 100° to 250° for the appropriate period of time.

Upon curing at elevated temperatures, a network of high crosslink density occurs. Accordingly, the expression "cure" as used herein, denotes the conversion of the polymers into insoluble and infusible crosslinked products, with simultaneous shaping to give shaped articles such as castings, pressings or laminates, or to give two dimensional structures such as coatings, enamels or adhesive bonds. The modified systems are advantageous for the formation of coatings because of the improved toughness of the resulting cured coatings.

The polymers prepared according to the invention can furthermore be mixed, at any stage before cure, with usual modifiers such as extenders, fillers and reinforcing agents, pigments, dyestuffs, organic solvents, plasticizers, tackifiers, rubbers, accelerators, diluents, and the like. As extenders, reinforcing agents, fillers and pigments which can be employed in the curable mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aeorsil"), lithopone, barite, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyrate, waxes, stearates and the like (which are in part also used as mold release agents) to the curable mixtures.

It is also possible in adhesive formulations, for example, to add rubbers such as carboxyl-terminated acrylonitrile-butadiene rubber, modifying resins such as triglycidyl p-aminophenol and accelerators such as boron trifluoride monoethylamine complexes or imidazole complexes.

The curable mixtures can be manufactured in the usual manner with the aid of known mixing equipment (stirrers, kneaders, rollers and the like).

The polymers of this invention are distinguished by ready solubility in solvents, stability in melt or solution form and good thermal mechanical properties of the products when properly cured, for example, good flexural and shear strength or interlaminar shear strength. Products obtained with them have good mechanical, thermal and electrical properties, have high glass transition temperatures and are substantially non-brittle. The polymers of this invention can also be readily applied from the melt, especially without the addition of non-volatile solvents, for example, for impregnation.

Polyimide polymers such as those described above have application in a broad range of end uses such as in composites, printed circuit boards, castings, molding compounds, adhesives and coatings. In view of the improved performance characteristics, the application of greatest interest is in high performance composite applications, pertinent, for example, to the aerospace industry. Thus, the polyimide resins are utilized to pre-impregnate various fibers for eventual use as honeycomb skins or structural parts. Techniques for preparing prepregs are well known to those skilled in the art. In terms of honeycomb skins and structural parts, graphite, glass, Kevlar reinforced skins and parts as well as others, can be readily prepared from the instant systems. Correspondingly, techniques for preparing laminates are well known. Such laminates may be prepared by compression or autoclave molding and may comprise a broad range of thicknesses. A further preferred area of use is adhesion promotion wherein the instant systems effectively improve adhesive performance characteristics.

The following examples illustrate the preferred embodiments of this invention. In these examples, all parts given are by weight unless otherwise noted.

EXAMPLE I

A solution of 563.9 grams (1.75 mol) of benzophenonetetracarboxylic acid dianhydride (BTDA) and 102.1 grams allylnadic anhydride (0.50 mol) in 2797.2 grams of N-methylpyrrolidone (NMP) is cooled to 5° C. in an ice-water bath and admixed with 532.8 grams (2.00 mol) of 5 (6)-amino-1-(4'-aminophenyl)-1,3,3,-trimethylindane (DAPI) over a 40 minute period to keep the temperature of the reaction mixture under 20° C. After the completion of the addition, the ice-water bath is removed and the stirring continued overnight at room temperature.

The amic acid material which remains in solution, is precipitated into water, washed with water and dried at 100° C. under reduced pressure for 24 hours. The inherent viscosity (0.5% in NMP at 25° C.) of this off-white material is 0.12.

EXAMPLE II

A solution of 644.4 grams (2.00 mol) of BTDA and 116.7 grams allylnadic anhydride (0.57 mol) in 4810 grams of N-methylpyrrolidone (NMP) is cooled to 5° C. in an ice-water bath and admixed with 608.9 grams (2.28 mol) of DAPI in 50 grams portions to keep the temperature under 20° C. The addition funnel is washed down with 250 grams of NMP. After removing the ice-water bath, the reaction mixture is maintained with stirring overnight at room temperature.

The resulting viscous amic acid solution is imidized with 1620.0 grams of acetic anhydride and 182.0 grams of triethylamine by stirring for six hours at room temperature. The imidized material, which remains in solution, is precipated into water, washed with water and dried at 100° C. under reduced pressure for 24 hours to afford 1240 grams (96.3%) of yellow polyimide with an inherent viscosity (0.5 percent in NMP at 25° C.) of 0.22.

EXAMPLE III

The procedure of Example II is repeated using pyromellitic anhydride in place of benzophenone-tetracarboxylic anhydride to afford a yellow polyimide with an inherent viscosity (0.5 percent in NMP at 25° C.) of 0.19.

EXAMPLE IV

Cured resin plaques are prepared utilizing the polymer of Example 1 after degassing at 26+inches Hg of vacuum for 15 minutes. The molten solution is then poured into ⅛" thick sheet molds and cured by the following cure cycle:

90 minutes @ 290° C.

varying periods of post cure @ 315° C.

Fully cured panels are obtained.

EXAMPLE V

The glass transition temperatures (Tg) of the crosslinked resins of Example 4 subjected to varying post cure periods are determined on a Perkin-Elmer TMA run at 20° C./min. in the penetration mode with a 40 g. weight with the following results.

| Post Cure Conditions | Tg(°C.) |
| --- | --- |
| initial–90 min. @ 290° C. in mold | 212 |
| 6 hours @ 315° C. | 271 |
| 10 hours @ 315° C. | 307 |
| 16 hours @ 315° C. | 314 |
| 16 hours @ 290° C. | 300 |

The system with 16 hours/315° C. post cure is likewise tested for short beam shear according to ASTM D-2344 at room temperature and 290° C. with the following results.

Room temperature—14,910 psi

290° C.—4,000 psi

These data thus substantiate the improved characteristics of the compositions of this invention.

EXAMPLE VI

Preparation of Laminates

Unidirectional graphite prepreg is prepared from the material of Example I utilizing Thornel T-500 graphite fiber (Union Carbide) on the U-D machine under heat and pressure. This gives a prepreg with acceptable drape and tack. The prepreg is cut, layed-up and cured by autoclave curing and post curing in an oven. Compression molding was conducted under varying pressures at 285°–300° C. with post cure being conducted for 16 hours at 315° C. to prepare the 65 mil thick composite panel.

The various panels were then tested for short beam shear at room temperature (ASTM D-2344), flexural properties at room temperature (ASTM D-790) and tensile properties (ASTM D-638) with the following results

|  | 50 PSI | 100 PSI | 150 PSI |
|---|---|---|---|
| short beam shear (ksi) | 15.7 | 15.0 | 15.0 |
| flexural strength (ksi) | 201.7 | 204.7 | 193.0 |
| flexural modulus (ksi) | 991.7 | 1082.0 | 901.8 |
| % tensile storage modulus loss at 300° C. | — | 10 | — |

These data indicate that composites with excellent properties can be achieved with the instant systems at reduced processing temperatures and pressures.

EXAMPLE VII

The polyimide of Example II is used to prepare 65 mil thick graphite reinforced composite panels. Thus, the polyimide is dissolved into NMP to 25–30 weight % solids and unidirectional (Hercules 12K-Magamite film) prepreg is prepared using a drum winding technique. The prepreg is staged for 15 minutes @ 100° C. followed by 15 minutes at 175°–205° C. The prepreg retains 5–10% of solvent for proper flow purposes. Standard press cycle used was:

R.T. to 205° C.—1 hour hold under full vacuum

205° C. to 230° C.—contact pressure

230° C. to 260° C.—apply 100 psi at 250° C.

260° C. to 285° C.—1.5 hour hold at 285° C.

Free Standing Post Cure 16 hours/315° C.

Short beam shear (ASTM D-2344) is conducted on the laminate at room temperature on a dry sample and on a sample exposed to 95% humidity at 71° C. for 48 hours.

dry—15,000 psi hot/wet—14,000 psi

This data further confirms the excellent mechanical properties of the instant systems.

Summarizing, it is seen that this invention provides improved polyimide systems, said improvements stemming primarily from the introduction of phenylindane diamines and the allylnadic anhydride. Variations may be made in procedures, proportions and materials without departing from the scope of the invention as defined by the following claims.

What is claimed is:

1. A polyamic acid obtained from the reaction of
(a) a phenylindane diamine of the formula

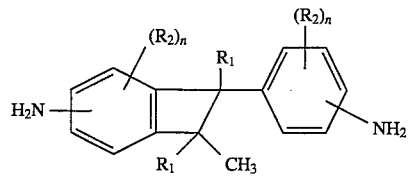

wherein $R_1$ is hydrogen or $C_1-C_5$alkyl;
$R_2$ independently are hydrogen, halogen or $C_1-C_4$alkyl;
and n is 1–4;

(b) a polyfunctional anhydride or ester thereof of the formulae

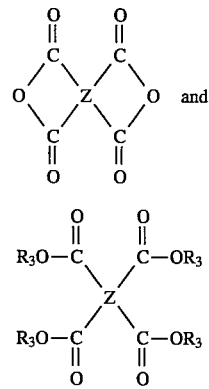

wherein Z is a tetravalent aryl radical; and
$R_3$ is hydrogen or $C_1-C_6$alkyl, with at least two $R_3$ groups being alkyl; and (c) a monofunctional anhydride of the formula

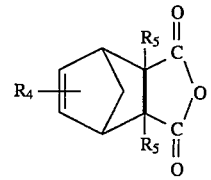

wherein $R_4$ is hydrogen, $C_1-C_6$alkyl, allyl or methallyl; and
$R_5$ is hydrogen or $C_1-C_6$alkyl.

2. The polyamic acid of claim 1 having an average molecular weight of 2,000–20,000.

3. The polyamic acid of claim 1, wherein component (a) is 5(6)-amino-1-(4'-aminophenyl)-1,3,3-trimethylindane.

4. The polyamic acid of claim 1, wherein component (b) is benzophenonetetracarboxylic acid dianhydride.

5. The polyamic acid of claim 1, wherein $R_4$ is hydrogen, allyl or methallyl and each $R_5$ is hydrogen.

6. The polyamic acid of claim 5, wherein component (c) is allylnadic anhydride.

7. A polyimide obtained from the imidization reaction of the polyamic acid of claim 1.

8. The polyimide of claim 7, having an average molecular weight of 2,000–20,000.

9. The polyimide of claim 7, wherein component (a) is 5(6)-amino-1-(4'-aminophenyl)-1,3,3-trimethylindane.

10. The polyimide of claim 7, wherein component (b) is benzophenonetetracarboxylic acid dianhydride.

11. The polyimide of claim 7, wherein $R_4$ is hydrogen, allyl or methallyl and each $R_5$ is hydrogen.

12. The polyimide of claim 11, wherein component (c) is allylnadic anhydride.

13. The product obtained by curing the polyamic acid of claim 1.

14. The product obtained by curing the polyimide of claim 7.

15. A laminate structure comprising the cured product of wound fibers impregnated with the polyamic acid of claim 1.

16. A laminate structure comprising the cured product of wound fibers impregnated with the polyimide of claim 7.

* * * * *